US010193588B2

(12) United States Patent
Volmer et al.

(10) Patent No.: US 10,193,588 B2
(45) Date of Patent: Jan. 29, 2019

(54) HEAD PROTECTION DEVICE, COMMUNICATION UNIT, CONNECTION UNIT AND SYSTEM COMPRISING HEAD PROTECTION DEVICE, COMMUNICATION UNIT AND CONNECTION UNIT

(71) Applicant: Dräger Safety AG & Co. KGaA, Lübeck (DE)

(72) Inventors: Achim Volmer, Lübeck (DE); Henning Ritter, Lübeck (DE); Jan Schöning, Lübeck (DE)

(73) Assignee: Dräger Safety AG & Co. KGaA, Lübeck (DE)

( * ) Notice: Subject to any disclaimer, the term of this patent is extended or adjusted under 35 U.S.C. 154(b) by 20 days.

(21) Appl. No.: 15/145,326

(22) Filed: May 3, 2016

(65) Prior Publication Data

US 2016/0329922 A1 Nov. 10, 2016

(30) Foreign Application Priority Data

May 4, 2015 (DE) .................. 10 2015 005 577

(51) Int. Cl.
*H04B 1/3827* (2015.01)
*H04R 1/10* (2006.01)
*G10L 21/0364* (2013.01)
*G10L 21/02* (2013.01)

(52) U.S. Cl.
CPC .......... *H04B 1/385* (2013.01); *H04R 1/1008* (2013.01); *G10L 21/02* (2013.01); *G10L 21/0364* (2013.01); *H04B 2001/3866* (2013.01); *H04R 2201/023* (2013.01); *H04R 2201/107* (2013.01)

(58) Field of Classification Search
CPC ............ H04B 1/385; H04B 2001/3866; H04R 2201/023; H04R 2201/107
USPC ...................................... 455/575.2
See application file for complete search history.

(56) References Cited

U.S. PATENT DOCUMENTS

2006/0281454 A1* 12/2006 Gray .................... A61B 5/0002
455/426.1
2012/0046074 A1 2/2012 Gittleman et al.
2014/0261405 A1 9/2014 Tekelenburg et al.
(Continued)

FOREIGN PATENT DOCUMENTS

DE   10 2012 018 799 A1   3/2014
WO      03/056 790 A1   7/2003

OTHER PUBLICATIONS

Martin, R.: 'Spectral Subtraction Based on Minimum Statistics,' EUSIPCO-94, Edinburgh, Scotland, Sep. 13-16, 1994, pp. 1182-1185.

Primary Examiner — Eugene Yun
(74) Attorney, Agent, or Firm — McGlew and Tuttle, P.C.

(57) ABSTRACT

A head protection device, e.g., a gas mask or a safety helmet, has a communication interface for sending a first communication signal and for receiving a second communication signal. Further, the gas mask has a signal processor providing an interface for sending the first communication signal, for detecting a microphone signal, for detecting the second communication signal and for sending an ear speaker signal. The signal processor is configured such that the first communication signal is sent as a function of the microphone signal, and that the ear speaker signal is further sent as a function of the second communication signal.

12 Claims, 12 Drawing Sheets

(56) References Cited

U.S. PATENT DOCUMENTS

2014/0274200 A1\* 9/2014 Olson ................. H04B 1/3877
 455/552.1

\* cited by examiner

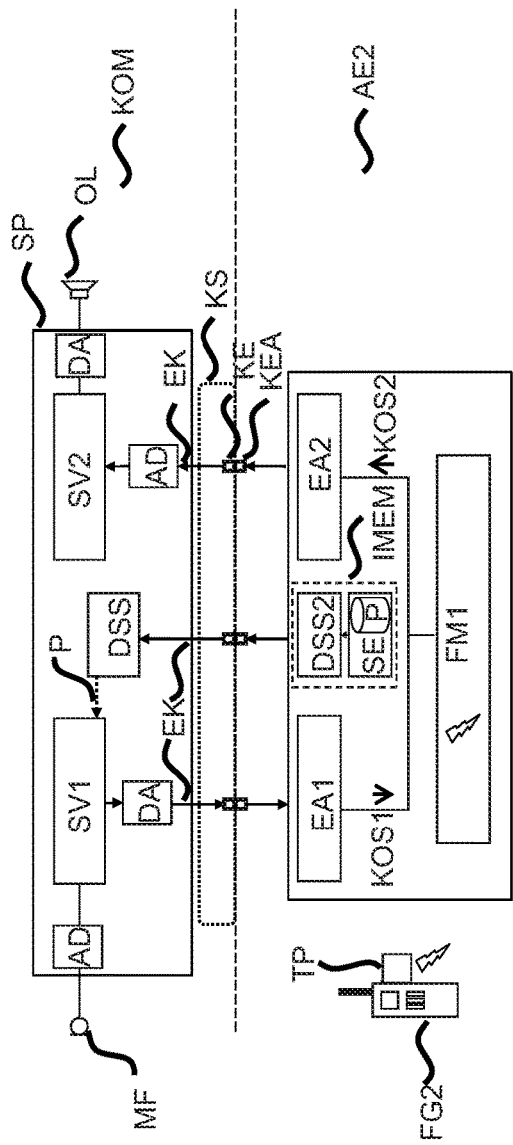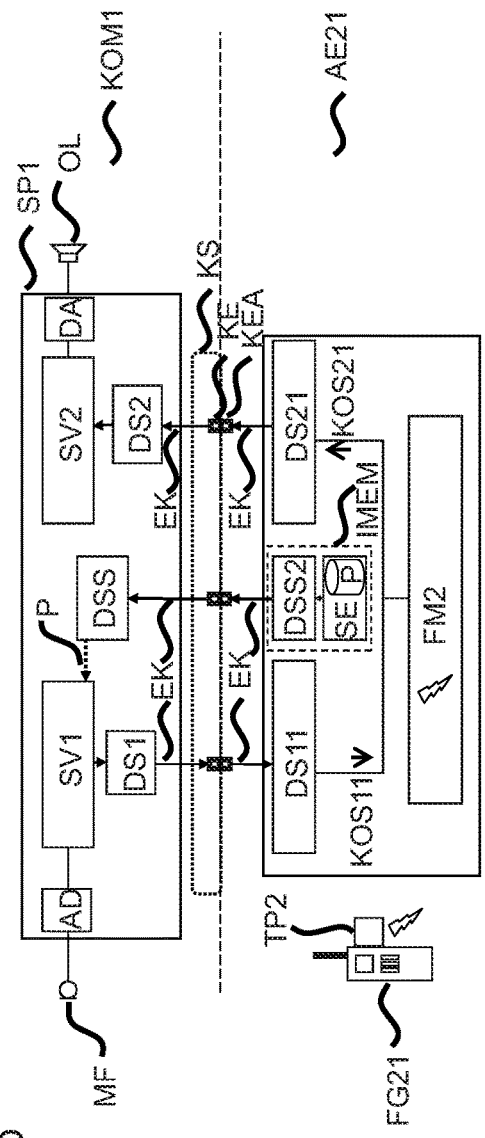

HEAD PROTECTION DEVICE, COMMUNICATION UNIT, CONNECTION UNIT AND SYSTEM COMPRISING HEAD PROTECTION DEVICE, COMMUNICATION UNIT AND CONNECTION UNIT

CROSS REFERENCE TO RELATED APPLICATIONS

This application claims the benefit of priority under 35 U.S.C. § 119 of German Patent Application 10 2015 005 577.1 filed May 4, 2015, the entire contents of which are incorporated herein by reference.

FIELD OF THE INVENTION

The present invention relates to a head protection device, in particular a gas mask or a safety helmet, with a communication unit that has a communication interface for transmitting a first communication signal and for receiving a second communication signal, wherein the communication unit has a signal processor with interfaces for sending the first communication signal, for detecting a microphone signal, for detecting the second communication signal and for sending an ear speaker signal.

BACKGROUND OF THE INVENTION

Rescue teams of fire departments or of mine rescue services sometimes find themselves in situations, in which a use of a head protection device in the form of a gas mask or safety helmet is advantageous or necessary. This may be the case, for example, in the case of firefighting or else in the case of other situations as well. In this case, a safety helmet, for example, which protects the head of the user, e.g., against falling objects, is used as a head protection device. As an alternative or in addition, a gas mask, for example, is used as a head protection device for protecting the breathing air supply of the user. The gas mask is preferably a so-called gastight full-face mask which seals both the eye area and the mouth and nose area of the user against the ambient air in a gastight manner. A compressed air breathing apparatus, a closed-circuit breathing apparatus or a breathing air filter, for example, may be connected to such a gas mask for the breathing air supply.

Besides a guarantee of freedom from harm to the head and a guarantee of the breathing air supply, the rescue teams also have to further rely on an adequate voice communication with one another. Each rescue team usually uses its own radio, via which the rescue team can communicate with other rescue teams for this. Such a radio is also called a tactical radio.

Head protection devices in the form of gas masks, into which a mask communication system with defined partial components is integrated, are known. Such a mask communication system may also be called a communication unit. The mask communication system has a connection to a microphone, which in turn detects a voice signal of the mask user. Further, the gas mask has a connection to an earpiece or ear speaker, which can be attached to the gas mask and can be positioned in the vicinity of the ear of the mask user. It is further known to connect the microphone and the ear speaker of the gas mask to the corresponding radio via a communication interface of the gas mask by means of a connection unit. In this connection, the connection unit has, for example, an electrical plug connector with a cable, which establishes one or more electrical connections from the communication interface via the cable to an electrical connection interface of the radio. Via this connection unit, the mask communication system exchanges communication signals with the radio, namely the microphone signal detected by the mask communication system and the voice signal received by the radio. The mask communication system then forwards the voice signal received by the radio to the ear speaker.

It is further known that both the microphone and the ear speaker are connected to a digital signal processor of the mask communication system in such a mask communication system. Such a signal processor is then further connected to the communication interface of the mask communication system. The signal processor is thus located, as viewed from the pattern of the signals, between the communication interface, on the one hand, and the microphone and earpiece, on the other hand. Such a signal processor carries out, for example, a digital signal processing in the form of a reduction of disturbing noise of the microphone signal before the thus digitally processed microphone signal is then sent as a communication signal to the communication interface for transmission to the radio. Further, such a signal processor also carries out, for example, a digital signal processing of the voice signal received by the radio via the communication interface before this voice signal is then sent to the ear speaker. It is consequently possible, for example, that the voice signal received by the radio and forwarded to the communication interface is limited in its maximum signal level in order to avoid, for example, damage to the hearing of the mask user.

SUMMARY OF THE INVENTION

An object of the present invention is to ensure a voice communication via a radio in connection with a head protection device with an as high as possible voice quality.

This object of the present invention is accomplished by a head protection device according to the invention. Further, this object is accomplished by a communication unit for connection to a head protection device according to the invention. Further, this object is accomplished by a connection unit for connection to a communication interface of a communication unit for a head protection device according to according to the invention. Further, this object is accomplished by a system comprising a head protection device with a communication unit and comprising a connection unit according to according to the invention.

The head protection device according to the present invention has a communication unit. The communication unit in turn has a communication interface for transmitting a first communication signal and for receiving a second communication signal. Further, the communication unit has a digital signal processor with interfaces for sending the first communication signal, for detecting a microphone signal, for detecting the second communication signal and for sending an ear speaker signal. The signal processor is configured such that the first communication signal is sent as a function of the microphone signal, and that the ear speaker signal is further sent as a function of the second communication signal. According to the present invention, the signal processor has, further, a data interface, which is in connection with the communication interface. Further, the signal processor is configured to input parameter data via the data interface. The signal processor is further configured such that it adapts a digital signal processing of the microphone signal to the sending of the first communication signal as a function of the parameter data.

The head protection device is preferably a gas mask or a safety helmet.

Further, a communication unit for connection to a head protection device is provided. According to the present invention, the communication unit is configured in such a way as was described above in reference to the head protection device.

Further, a connection unit for connection to a communication interface of a communication unit for a head protection device is provided. The connection unit is configured to receive a first communication signal from the communication interface and to transmit it to a radio. Further, the connection unit is configured to receive a second communication signal from the radio and to transmit it to the communication interface. According to the present invention, the connection unit has a memory unit, which contains parameter data, wherein the memory unit can be read out via the communication interface when the connection unit is connected to the communication interface.

Further, a system comprising a head protection device with a communication unit and a connection unit is provided. The communication unit has a communication interface. The connection unit is configured for connection to the communication interface. The connection unit is further configured to receive a first communication signal from the communication interface and to transmit the first communication signal to a radio. The connection unit is further configured to receive a second communication signal from the radio and to transmit the second communication signal to the communication interface. The communication interface is configured to transmit the first communication signal to the connection unit and to receive the second communication signal from the connection unit. The communication unit has, further, a signal processor with interfaces for sending the first communication signal, for detecting a microphone signal, for detecting a second communication signal and for sending an ear speaker signal. The signal processor is configured such that the first communication signal is sent as a function of the microphone signal, and that the ear speaker signal is further sent as a function of the second communication signal. The connection unit has, further, a memory unit, which contains parameter data, wherein the memory unit can be read out via the communication interface when the connection unit is connected to the communication interface. The signal processor has, further, a data interface, which is in connection with the communication interface. The signal processor is further configured to read out the parameter data via the data interface. The signal processor is further configured such that the signal processor adapts a digital signal processing of the microphone signal for sending the first communication signal as a function of the parameter data.

The communication signals are preferably analog or digital voice signals.

The aspects explained below shall be taken into consideration to be able to appreciate the advantages gained by the solution according to the present invention.

Rescue teams, which use a head protection device combined with a radio for communication, employ radios of different types or according to different radio standards in this case. Such radios frequently carry out a voice transmission by means of a digital transmission, which entails, for example, coding of the voice signals according to a corresponding voice codec. For example, digital radios, which use the so-called TETRA standard (ETSI EN 300 392-2 V3.2.1: Terrestrial Trunked Radio (TETRA)) are used in Germany, whereas, for example, radios according to the so-called P25 standard (TIA-102 SERIES, TELECOMMUNICATIONS, LAND MOBILE COMMUNICATIONS (APCO/PROJECT 25)) are used in the USA. Other radios of other standards and correspondingly different voice codecs are conceivable in this connection.

The particular voice codecs of the particular transmission standards are not identical to one another, but rather are, for example, designed for different spectral colorings or frequency responses of the voice signals to be transmitted. Thus, it is advantageous for obtaining an optimized or qualitatively improved voice transmission to subject the microphone signal to a digital signal processing by the signal processor such that a spectral coloring or a frequency response of the microphone signal is adapted to the voice codec of the radio. Since the communication interface of the head protection device is in connection with the data interface of the signal processor, the necessary set of parameters can be read out from the speaker unit of the connection unit when the connection unit is connected to the communication interface and can then be used directly by the signal processor for spectral coloring or adaptation of the frequency response of the first communication signal. This solution according to the present invention allows the signal processor to be automatically configured by the connection unit having a set of parameters in its memory unit, which then leads to a spectral coloring of the first communication signal, which is adapted to the corresponding radio. Thus, only such a connection unit for connection of the radio to the gas mask, the memory unit of which contains a set of parameters, which corresponds to the voice codec of the radio standard, has to be selected for an adaptation of the configuration of the signal processor to a defined radio with a corresponding radio standard or voice codec.

Instead of the adapted digital signal processing of the microphone signal in the form of an adaptation of the frequency response of the first communication signal, the adapted digital signal processing is that an adaptation or a limitation of the signal level of the first communication signal may be made. The first communication signal to be sent in the digital range is thus limited in its maximum level, the maximum level value being predefined, for example, by the parameter data. Such a level limit of the first communication signal is then advantageous if the radio, at its signal input, can process only signals with a certain maximum level. Consequently, an overmodulation of the signal input is prevented.

As an alternative form of an adaptation of the digital signal processing of the microphone signal, it is possible to subject the first communication signal to be sent to a compressor characteristic in the digital time period in order to amplify, for example, particularly low signal portions in their current signal energy. Parameters of the compressor characteristics are then predefined, for example, by the parameter data. This is then advantageous if the voice codec of the radio achieves an improved voice intelligibility in case the current signal energy of the processed microphone signal or of the first communication signal exceeds a certain minimal value.

It can be stated in summary that by selecting a defined type of connection unit with defined parameter data in its corresponding memory unit for a defined type of radio, it can be guaranteed that a voice communication is optimized in voice communication quality, since an adaptation to the defined type of radio takes place due to the defined parameter data such that the signal processor is automatically configured such that it adapts the digital signal processing of the microphone signal or of the first communication signal to the defined type of radio. For other types of radio, a correspondingly different connection unit shall then be used.

Since the signal processor already present in the communication unit is used, an additional signal processor does not need to be provided, e.g., within the connection unit with corresponding analog-digital and digital-analog converters, which in turn makes possible a cost-effective production of the connection unit. The signal processor already present in the communication unit can thus be used. A communication unit, which can be adapted in a simple manner in terms of a voice intelligibility for different radio standards, can consequently be produced in an especially cost-effective manner. Further, a connection unit can be adapted in a particularly simple manner to a particular type of radio with corresponding radio standard, since only the parameter data stored in the memory unit have to be adapted to the radio type or radio standard.

In other words: It shall only be ensured that the connection unit has a memory unit, which can be read out when the connection unit is connected to the communication interface and which contains the corresponding parameter data. Thus, a digital signal processing of the microphone signal can be configured in an especially simple manner by, matching the particular radio with the particular digital transmission standard, a corresponding connection unit being selected, which contains in its memory unit parameter data, which in turn lead to a digital signal processing, which is adapted to the corresponding radio standard, during the use of the signal processor. Thus, a configuration of the signal processor is possible in an especially simple manner as long as the connection unit corresponding to the signal processor is used for a defined type of radio with a defined digital transmission standard. The type of connection unit corresponding to a type of radio may advantageously be correspondingly characterized by indicia or a lettering for a defined radio such that a user can select the type of connection unit corresponding to the defined radio from a quantity of various connection units by means of simple reading of such a lettering.

Another possible advantage is that the solution suggested according to the invention is especially compact, since no further, additional signal processing units are needed for the signal processing carried out by the digital signal processor and thus no additional units or components have to be built into the head protection device.

Another possible advantage is that only the signal processor already present has to be operated via a supply of energy, whereas a solution using an additional signal processor would make a further, additional supply of energy necessary.

Another possible advantage is that the adaptation of the digital signal processing by means of the already present signal processor makes possible a signal processing, which avoids an undesired signal damping and thus guarantees a defined average signal power, whereas a solution using passive line elements for adapting the frequency response or the signal level could bring about an undesired signal damping of the first communication signal.

The communication interface is preferably an electrical contact unit, which has a plurality of contact elements. This is advantageous since the communication signals as well as the parameter data are accessible at the same time via the contact elements and it only has to be ensured that the connection unit is in correct mechanical and correct electrical connection to the communication interface and the contact unit. It is thus made possible that a user of the head protection device carries out the plurality of necessary electrical connections by joining the connection unit and the contact unit as communication interface by means of establishing a single mechanical connection.

The communication signals are preferably analog, electrical audio signals. This is advantageous in case the radio can only exchange analog audio signals as communication signals.

The communication signals are preferably digital, electrical signals. This is advantageous in case it is a radio, which can exchange digital, electrical signals as communication signals, which in turn can be further processed directly in the signal processor as digital signals. Such signals are, for example, pulse-code-modulated (PCM) audio signals or else signals of a voice codec that represent audio signals.

The connection unit preferably has an electrical contact unit, which in turn has a plurality of contact elements and which can be brought into connection with the corresponding contact unit of the communication interface. This is advantageous since, as already mentioned above, the user of the head protection device only has to establish a proper connection between the connection unit and the communication interface of the head protection device in order to provide for an exchange both of the communication signals and of the parameter data via the data interface.

The connection unit is preferably configured to receive the first communication signal as an analog, electrical signal from the communication interface and further to transmit the second communication signal as an analog, electrical signal to the communication interface. This is advantageous since the connection unit thus makes possible an exchange of communication signals to a radio with an analog signal interface.

The connection unit is preferably configured to receive the first communication signal as a digital, electrical signal from the communication interface and further to transmit the second communication signal as a digital, electrical signal to the communication interface. This is advantageous in case the radio makes possible an exchange of the communication signals as digital, electrical signals, for example, PCM signals or voice-coded signals.

The connection unit is preferably configured to transmit the first communication signal to the radio via a wire connection and further to receive the second communication signal from the radio via the wired connection. This is advantageous since a wired connection of the connection unit to the radio makes possible an especially cost-effective production and likewise an especially robust transmission of the communication signals between the connection unit and the radio.

The connection unit is preferably configured to transmit the first communication signal to the radio via a radio connection and further to receive the second communication signal from the radio via the radio connection. This is advantageous since a radio connection between the connection unit and the radio, for example, as a Bluetooth connection, makes the use of an additional cable between these units obsolete, which makes possible an increased freedom of motion of the mask user.

The present invention is explained in detail below based on special embodiments without limiting the general idea of the invention based on the figures.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 9a is a diagram showing a first variant of the signal processor as well as of the connection unit according to the second exemplary embodiment;

FIG. 9b is a diagram showing a second variant of the signal processor as well as of the connection unit according to the second exemplary embodiment;

DESCRIPTION OF THE PREFERRED EMBODIMENTS

Figure 1A:
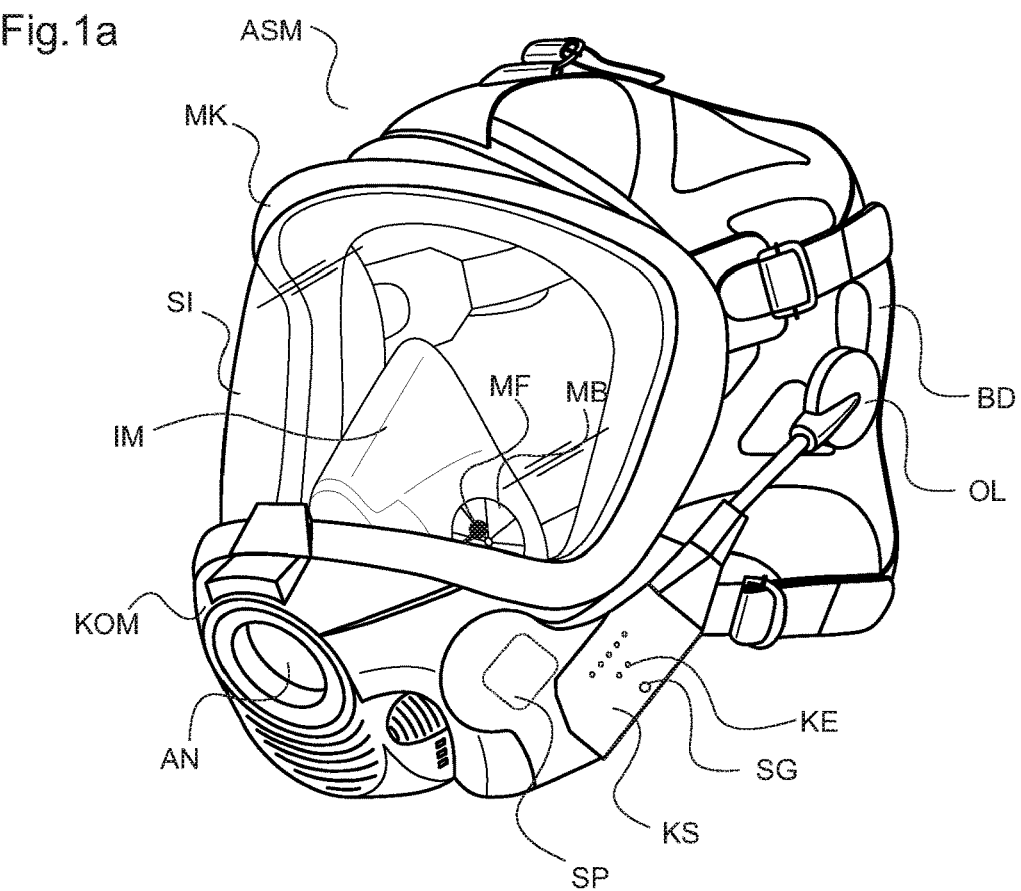
FIG. 1a is a head protection device according to the present invention in the form of a gas mask with communication unit according to a first exemplary embodiment.

Referring to the drawings, FIG. 1a shows a head protection device according to the present invention in the form of a gas mask ASM according to a first exemplary embodiment. The gas mask ASM has a connection AN, which is configured for connection to a compressed air breathing apparatus, a closed-circuit breathing apparatus or a breathing air filter.

The gas mask ASM is a gastight full-face mask, which seals both the eye area and the mouth area and the nasal area of the user against the ambient air in a gastight manner.

The gas mask ASM has a mask body MK with an inner mask IM and an eye-protecting lens SI. Further, a communication unit KOM, which can be brought mechanically into connection with the gas mask ASM, is shown. The communication unit KOM essentially circulates around the jaw and mouth area of the user.

The communication unit KOM has a signal processor SP, which is shown in dotted line, since it is located within the communication unit KOM and is not absolutely directly visible from outside.

The gas mask ASM has, further, a diaphragm MB, which is a voice diaphragm, which reproduces acoustic fluctuations of a voice signal generated by the user. The communication unit KOM has a microphone MF, which detects a voice signal of the user of the gas mask. The microphone MF is preferably positioned in front of the diaphragm MB such that it detects acoustic fluctuations of the voice signal of the user transmitted by the diaphragm MB. As an alternative to this, the microphone is located on the inner side of the diaphragm MB directed toward the face of the user.

The gas mask ASM has, further, a strap BD, by means of which the gas mask can be attached to the head of the user.

The communication unit KOM has, further, an ear speaker OL, which is an integral component of the communication unit KOM according to this exemplary embodiment. Both the ear speaker OL and/or also the microphone MF are preferably not integral components of the communication unit KOM, but rather the communication unit KOM has at least one interface, to which the ear speaker OL and/or the microphone MF can be connected.

Figure 1B:
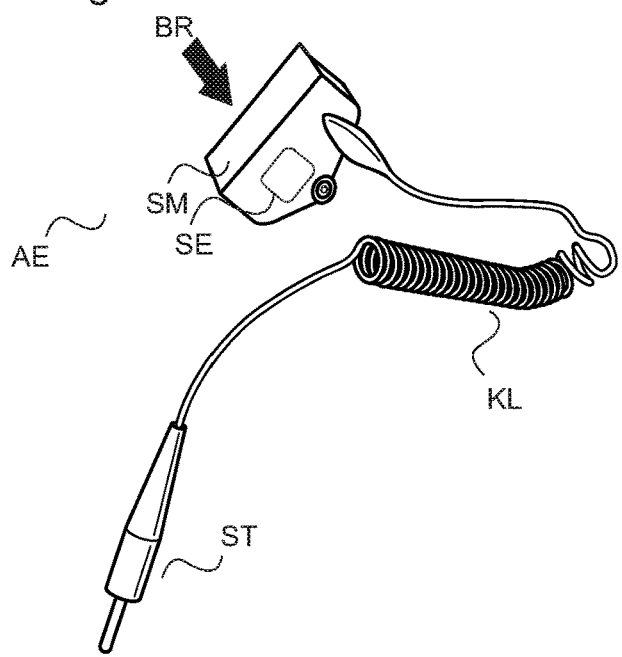
FIG. 1b is a connection unit according to the present invention according to the first exemplary embodiment.

The communication unit KOM has, further, a communication interface KS, to which a connection unit AE from FIG. 1b can be connected. The communication interface KS is an electrical contact unit, which has a plurality of contact elements KE.

The signal processor SP has signal interfaces, which are not explicitly shown in FIG. 1a. The signal processor SP has a signal interface, by means of which it detects a microphone signal of the microphone MF. Further, the signal processor has a signal interface, by means of which it sends a signal to the ear speaker OL. The signal processor is connected for this in a suitable manner via these signal interfaces to the microphone MF and to the ear speaker OL. These connections are preferably established by receiving devices being provided on the gas mask ASM or the communication unit KOM, into which the ear speaker OL and the microphone MF can be inserted, and which are connected to the corresponding signal interfaces of the signal processor SP. In such a case, the microphone MF and the ear speaker OL are not integral components of the communication unit KOM or of the gas mask ASM, but rather the communication unit KOM or the gas mask ASM has only corresponding receiving devices for the ear speaker OL and the microphone MF.

The signal processor SP has, further, a signal interface for sending the first communication signal and for detecting the second communication signal via a signal interface. For this, the signal processor is in connection with the communication interface KS via these signal interfaces. The signal interfaces of the signal processor SP for exchanging the communication signals are electrically connected for this to corresponding contact elements KE of the communication interface KS. The communication interface KS is thus a bidirectional communication interface.

The communication interface KS is preferably located in an external area of the communication unit KOM. The communication interface KS, as electrical contact unit, represents a unit for a mechanical and at the same time electrical connection of a connection unit. The connection unit can preferably be mechanically connected to the communication interface KS via a screw connection, for which the communication interface KS preferably has a screw thread SG. As an alternative, a mechanical connection of the communication interface to the connection unit to be connected is established by means of a plastic snap connection, which is preferably combined with a screw connection. An electrical connection of the communication interface KS to the connection unit is established via particular, corresponding electrical contact elements of the connection unit and of the communication interface, which establish particular, corresponding electrical contacts in case of a mechanical connection of the connection unit and of the communication interface.

A signal interface of the signal processor SP is preferably electrically connected to each one of the contact elements KE or to each of a plurality of contact elements KE of the communication interface KS. A plurality of signal interfaces of the signal processor preferably share a same contact element KE as a common ground potential at the communication interface KS. This is also called common ground.

The contact elements KE are preferably bushing elements, so that a connection unit AE to be connected has corresponding plug elements as corresponding contact elements.

As an alternative, the contact elements KE of the communication interface KS are so-called pin contacts, which are dimensioned such that a force, which ensures a sufficient electrical contact between these contact elements, acts between these pin contacts of the communication interface KS and the corresponding pin contacts of the connection unit to be connected when the connection unit is connected to the communication interface. Such pin contacts of the communication interface KS and/or of the connection unit AE are preferably coupled with mechanical spring elements in order to guarantee the electrical contact to be ensured between the contact elements KE of the communication interface KS and the contact elements of the connection unit AE.

The signal interfaces of the signal processor SP for exchanging the communication signals are, as already mentioned above, electrically connected to corresponding contact elements KE of the communication interface KS. This electrical connection may be established, for example, by a direct electrical connection by means of wiring or by means of conductor elements. The connection of the signal interfaces of the signal processor SP to the contact elements KE of the communication interface KS is preferably established as an indirect electrical connection, in which particular electrical analog components are interconnected between the signal interfaces and the contact elements KE.

A precise mode of action between the signal processor SP of the communication unit KOM via the contact elements KE of the communication interface KS is explained in detail later for this first exemplary embodiment in two variants with reference to FIGS. 8a and 8b.

FIG. 1b shows a connection unit AE according to the first exemplary embodiment. The connection unit AE is suitable for connection to the communication interface KS of the communication unit KOM from FIG. 1a. The connection unit AE has a plug-in module SM and a cable KL with plug ST. The connection unit AE is configured to receive a first communication signal from the communication interface and to transmit it to a radio. The connection unit AE is further configured to receive a second communication signal from the radio and to transmit it to the communication interface.

The connection unit AE has a memory unit SE, which is shown in dotted line in FIG. 1b, since it is possibly not directly visible from outside. The memory unit SE contains parameter data. If the connection unit AE from FIG. 1b is connected to the communication interface KS of the communication unit KOM, then the memory unit SE can be read out via the communication interface KS. For this, the memory unit is directly or indirectly electrically connected to one or more contact elements KEA, shown in FIG. 1c, of the connection unit AE.

The connection unit AE has a connection cable, which can be connected to a corresponding plug-in connection of a radio by means of a plug ST.

Figure 1C:
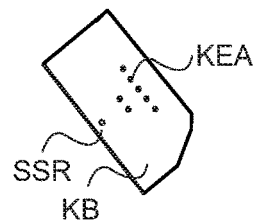
FIG. 1c is a connection area of the connection unit according to the present invention according to the first exemplary embodiment.

FIG. 1c shows a contact area KB, which is a part of the connection unit AE from FIG. 1b and lies on the back side of the connection unit shown in FIG. 1b. This back side is visible in the direction of view BR to the connection unit AE in FIG. 1b.

The contact area KB from FIG. 1c has contact elements KEA, which correspond to the contact elements KE of the communication interface KS from FIG. 1a.

As already mentioned above, the contact elements KEA of the connection unit are preferably plug-in elements or plugs, which can mesh with bushings of the communication interface KS from FIG. 1a. As likewise mentioned above, the contact elements KEA are preferably so-called pin elements, which are preferably acted on by a minimal force via corresponding spring elements in order to guarantee an electrical connection between the contact elements KEA of the connection unit and the contact elements KE of the communication interface.

According to FIG. 1c, the connection unit preferably has a safety screw SSR in the contact area KB, which screw is dimensioned to mesh with a screw thread SG from FIG. 1a.

Figure 2:
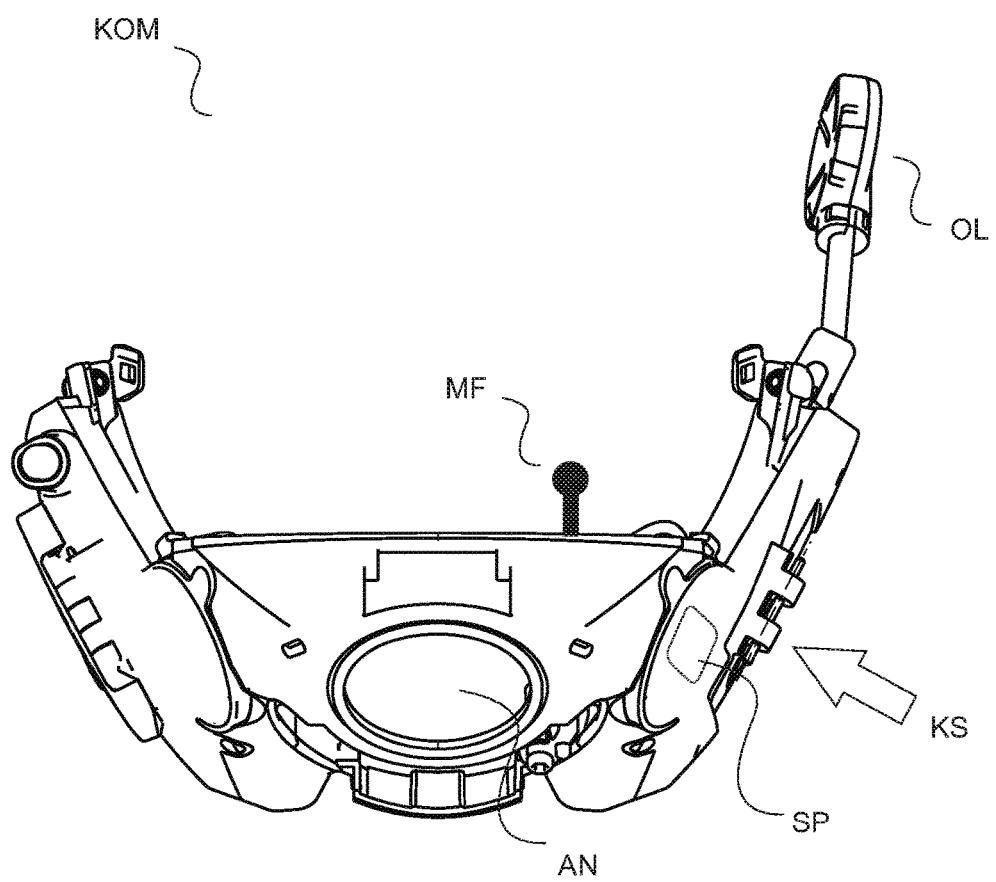
FIG. 2 is another view of the communication unit according to the present invention according to the first exemplary embodiment.

FIG. 2 shows the communication unit KOM detached from the head protection device in the form of the gas mask ASM from FIG. 1a. The communication unit KOM has a recess for the above-mentioned connection AN of a compressed air breathing apparatus, a closed-circuit breathing apparatus or a breathing air filter. The communication unit is shown here together with the microphone MF and the ear speaker OL, which are not necessarily integral components of the communication unit KOM. The communication unit KOM has, further, the above-mentioned signal processor SP. The communication interface KS described above is not directly visible in the view of FIG. 2, but is located in a side area of the communication unit KOM indicated by an arrow.

Figure 3:
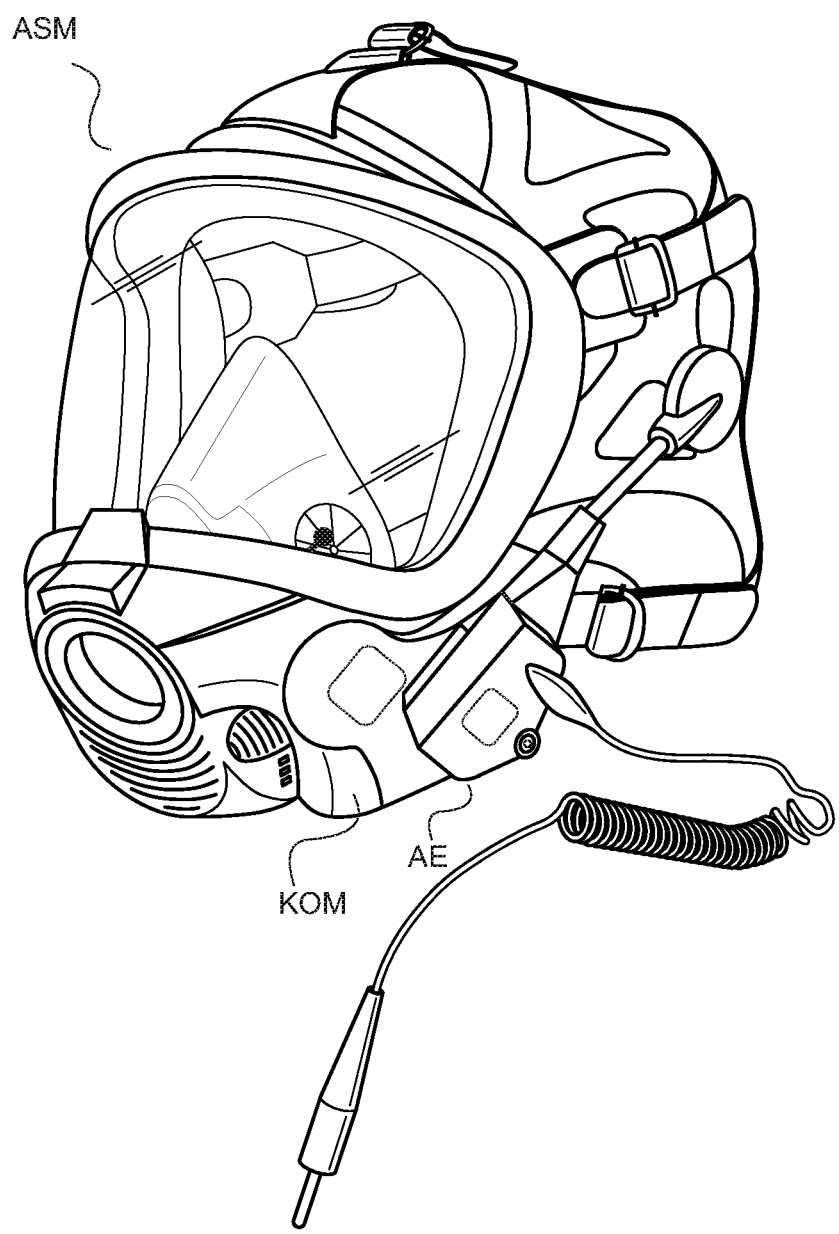
FIG. 3 is the head protection device according to the present invention in the form of a gas mask according to the first exemplary embodiment with connection unit connected to the communication interface.

FIG. 3 shows the system according to the present invention comprising the head protection device in the form of the gas mask ASM and comprising the connection unit AE according to the first exemplary embodiment. In this case, the connection unit AE is connected to the communication interface of the communication unit KOM.

Figure 8A:
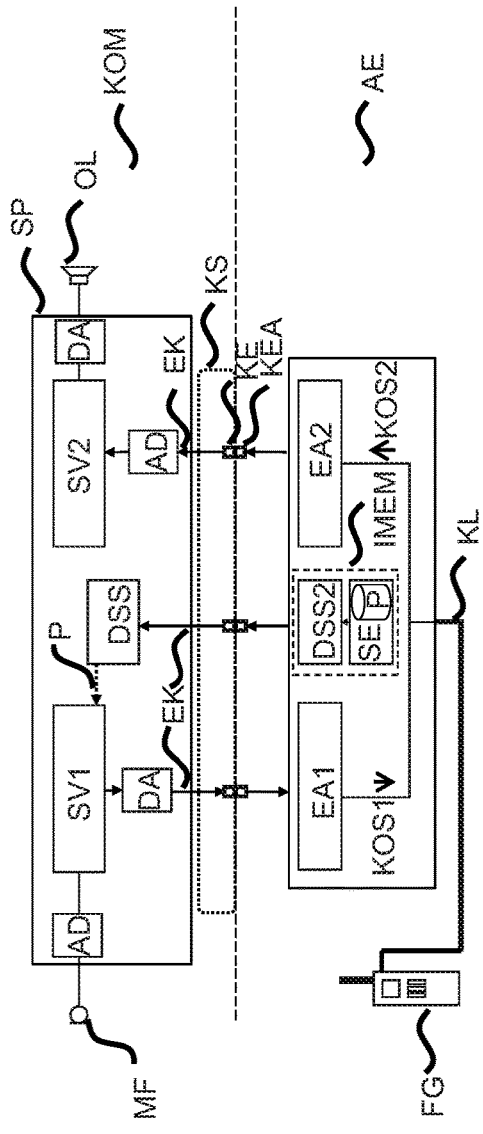
FIG. 8a is a diagram showing a first variant of the signal processor as well as of the connection unit according to the first exemplary embodiment.

FIG. 8a shows the signal processor SP of the communication unit KOM as well as the connection unit AE according to a first variant of the first exemplary embodiment. Elements above the dotted line belong to the communication unit KOM. Elements below the dotted line belong to the connection unit AE, with the exception of the radio FG shown.

The signal processor SP is connected to the microphone MF of the communication unit KOM via a signal interface AD, preferably via an analog-digital converter. This connection is preferably not established directly to the microphone MF, but rather the signal interface AD is connected to a receiving device or to a contact unit, which can be connected to the microphone MF. In this case, the microphone MF is not an integral component of the communication unit KOM.

Further, the signal processor SP is connected to the ear speaker OL of the head protection device via a signal interface DA, preferably a digital-analog converter. The signal interface DA is preferably not connected directly to the ear speaker OL, but rather to a receiving or holding device or even a contact device for such an ear speaker OL, so that the ear speaker OL is not an integral component of the communication unit KOM.

The signal processor SP has, further, a signal interface AD, preferably an analog-digital converter, which is configured for detecting a communication signal KOS2 from a radio FG and is connected to the communication interface KS. Further, the signal processor has a signal interface DA, which is preferably provided as a digital-analog converter, which is suitable for sending a first communication signal KOS1 to the radio FG and is in connection with the communication interface KS.

The communication interface KS is schematically indicated in FIG. 8a with communication interface KS contact elements KE. An electrical connection of the contact elements KEA of the connection unit AE to the contact elements KE of the communication interface KS is indicated in FIG. 8a for the case of the connection of the communication interface KS and the connection unit AE.

The connection of the signal interfaces DA, AD to the contact elements KE of the communication interface KS for exchanging the communication signals is established by direct or indirect electrical contacts EK.

The signal processor SP has, further, a data interface DSS, which is in connection with the communication interface KS. This connection is preferably established by the data interface DSS being directly or indirectly connected to one or more contact elements KE of the communication interface KS via one or more electrical contacts EK. The data interface DSS of the signal processor SP is configured such that parameter data P can be inputted via this data interface DSS, which is explained in greater detail below.

The signal processor SP is configured such that the signal processor SP uses parameter data P inputted via the signal site DSS in a digital signal processing step SV1, in which a first communication signal KOS1 is sent by means of the signal interface DA via the communication interface KS as a function of the microphone signal of the microphone MF.

The signal processor SP carries out, further, signal processing steps SV2, by means of which it uses a second communication signal KOS2 received at the communication interface KS and detected via the signal interface AD in order to send an ear speaker signal via the signal interface DA at the ear speaker OL as a function of this second communication signal KOS2.

The connection unit AE has, as described above, a cable KL, which can be connected to a radio FG via a plug, not shown here, in order to make possible an exchange of said communication signals. The cable KL is preferably a multiconductor cable, which can be connected to the radio FG as a bidirectional signal cable.

The connection unit AE forwards the first communication signal KOS1 to the radio. Further, the connection unit AE forwards the second communication signal KOS2 to the communication interface KS.

An electrical adaptation of the first communication signal KOS1 preferably takes place in an electrical unit EA1 comprising passive, analog electrical elements. This is preferably provided by an impedance adaptation.

Further, an electrical adaptation of the second communication signal KOS2 preferably takes place by an electrical unit EA2 by means of passive, analog electrical components. This is preferably likewise an impedance adaptation.

The contact elements KEA of the connection unit AE are thus indirectly or directly electrically connected to the plug of the cable KL of the connection unit AE, so that an indirect or direct electrical connection is established between the radio FG and the contact elements KEA. The direct connection is obtained in case the electrical elements EA1 and EA2 are replaced by direct electrical contacts.

According to this first variant of the first exemplary embodiment from FIG. 8a, the first communication signal KOS1 and the second communication signal KOS2 are analog electrical signals, which are exchanged with the radio FG. Both the microphone signal and the ear speaker signal are likewise analog electrical signals according to this exemplary embodiment.

The connection unit AE has a memory unit SE, in which parameter data P are stored. Via a data interface DSS2 in connection with the memory unit SE, which in turn is connected to at least one contact element KEA of the connection unit, these parameter data can thus be read out via the communication interface KS when the connection unit AE is connected to the communication interface KS.

The memory unit SE is preferably an integrated memory element IMEM, into which the data interface DSS2 and the memory element SE proper are integrated. Thus, when the connection unit AE is connected to the communication interface KS, a connection is established between the data interface DSS of the signal processor SP and the data interface DSS2 of the connection unit AE. The data interface DSS2 as well as the data interface DSS are preferably interfaces to a data bus. The data bus is preferably a serial data bus.

The integrated memory element IMEM is preferably a microcontroller according to a first alternative. The microcontroller preferably has the memory element as an integrated flash memory. Preferably, the microcontroller has an $I^2C$ interface for an $I^2C$ bus as data interface DSS2. Via this data interface, the microcontroller can receive a signal, which indicates an activation of a push-to-talk button. The push-to-talk button is preferably arranged in or on the communication unit KOM. In this case, the push-to-talk button is connected to a computer, which is a part of the communication unit KOM and which detects an activation of the push-to-talk button. The computer has an $I^2C$ interface for an $I^2C$ bus. The computer sends a signal, which indicates an activation of the push-to-talk button via the $I^2C$ interface. The $I^2C$ interface of the microcontroller receives this signal. The microcontroller then sends another signal, which indicates the activation of the push-to-talk button, via the data interface DSS2 or the communication interface KS. The signal processor SP is configured in this case such that the signal processor SP detects a presence of the other signal and the signal processor SP sends an instruction signal to the microcontroller if the other signal is present. Upon receiving the instruction signal, the microcontroller then activates the signal lines between the connection unit and the radio.

According to a second alternative, the integrated memory element IMEM is an integrated memory element in the form of an $E^2$ PROM, Programmable Read Only Memory (PROM), into which the data interface DSS2 and the actual memory element SE itself are integrated. In this connection, the integrated memory element IMEM has, as a data interface DSS2, an integrated interface in the form of an I²C bus interface or an SPI interface. The E² PROM memory element is a long-lasting flash PROM as a nonvolatile memory. The integrated memory element IMEM has in this case, as a data interface DSS2, an I²C interface or an SPI interface (Serial Peripheral Interface). As an alternative, the data interface DSS2 is configured as an RS232 interface.

The integrated memory unit IMEM is preferably a part of a printed circuit board, which has, as a plug interface, directly corresponding contact elements KEA, which then mesh with or are in contact with corresponding contact elements KE of the communication interface KS there.

The signal interface DSS of the signal processor SP systematically, preferably cyclically, checks for a presence of a direct or indirect connection to a memory unit IMEM, SE at the corresponding contact elements KE of the communication interface. To this end, the data interface DSS preferably uses an address of the data interface DSS2 or of the memory element SE, under which it attempts to poll the stored parameter data P. Thus, the data interface DSS of the signal processor SP then checks for the physical readiness of a possibly connected memory element IMEM, SE for providing the parameters. If the data interface DSS of the signal processor SP detects the physical readiness of a connection memory element IMEM, SE, then the data interface DSS then reads out the parameter data P from the memory element IMEM, SE. The data interface DSS uses the corresponding address for this. The data interface DSS then provides the parameter data P to the signal processor SP.

According to FIG. 8a, the radio FG is preferably a radio, which carries out the communication to other radios via a digital transmission standard, but exchanges only analog, electrical audio signals as the communication signals at the interface to the plug, which is not shown, to the cable KL. For this, the radio FG itself possibly has an analog-digital converter or a digital-analog converter.

The signal processor SP carries out the adaptation of the digital signal processing SV1 of the microphone signal for sending the first communication signal KOS1 as a function of the parameter data P. This adaptation of the signal processing SV1 is preferably carried out by an adaptation of a digital filtering or of a digital filter. A digital filtering is an especially efficient implementation for adapting signal properties of the microphone signal, since sometimes only a few parameter data P have to be provided in order to define a digital filter to be used. More precise details of the digital filtering or digital signal processing SV1 by the signal processor SP shall still be explained in detail below with reference to FIG. 10.

Figure 8B:
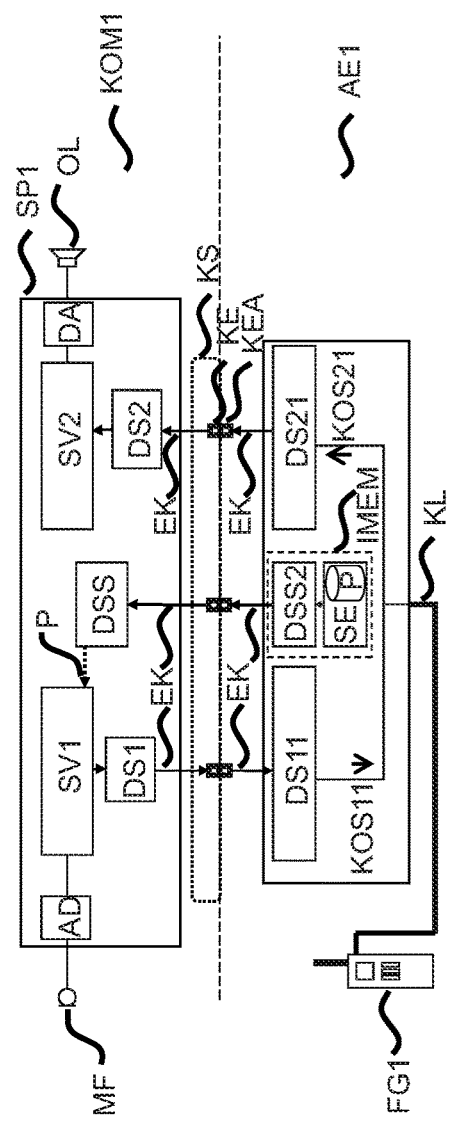
FIG. 8b is a diagram showing a second variant of the signal processor as well as of the connection unit according to the first exemplary embodiment.

FIG. 8b shows a second variant of the first exemplary embodiment, in which a variant AE1 of the connection unit and a variant KOM1 of the communication unit are effective. Elements above the dotted line belong to the communication unit KOM1. Elements below the dotted line belong to the connection unit AE, with the exception of the radio FG1 shown.

FIG. 8b shows the connection unit AE, in which the first communication signal KOS11 is sent from a digital signal interface DS11 of the connection unit AE1 to the communication interface KS. The signal processor SP1 differs from the signal processor SP from FIG. 8a in that it sends the first communication signal KOS11 via a digital signal interface DS1. The first communication signal KOS11 is a digital electrical signal in this case. Such a digital electrical signal is, for example, a pulse-code-modulated (PCM), digital electrical signal or else an audio signal as a digital signal which was already subjected to voice coding. A voice coding is preferably carried out as part of the digital signal processing steps SV1 by the signal processor SP1.

Furthermore, the connection unit AE1 has a digital signal interface DS21, via which the second communication interface KOS21 is received or detected by the communication interface KS. The signal processor SP1 differs from the signal processor SP from FIG. 8a, further, in that it has a digital signal interface DS1, via which it detects the second communication signal KOS21. This second communication signal KOS21 is a digital electrical signal in the manner as the above-described first communication signal KOS11. A voice coding is preferably carried out by the signal processor SP1 as part of the signal processing steps SV2.

According to the second variant of the first exemplary embodiment, as shown in FIG. 8b, the communication signals KOS11 and KOS21 are exchanged with a radio FG1 via a cable KL. This radio FG1 is, for example, such a radio FG1, in which communication signals are exchanged to the cable KL as digital electrical signals in the manner described above.

The variant of the connection unit AE1 shown in FIG. 8b has the advantage that a communication is made possible in case this communication shall be carried out via a radio, which only sends or receives digital electrical signals.

The connection unit AE or AE1 from FIG. 8a or 8b proper preferably has the respective radio FG or FG1. The connection unit AE or AE1 is then connected to the radio FG or FG1 via an internal interface, preferably an internal data interface.

Figure 4:
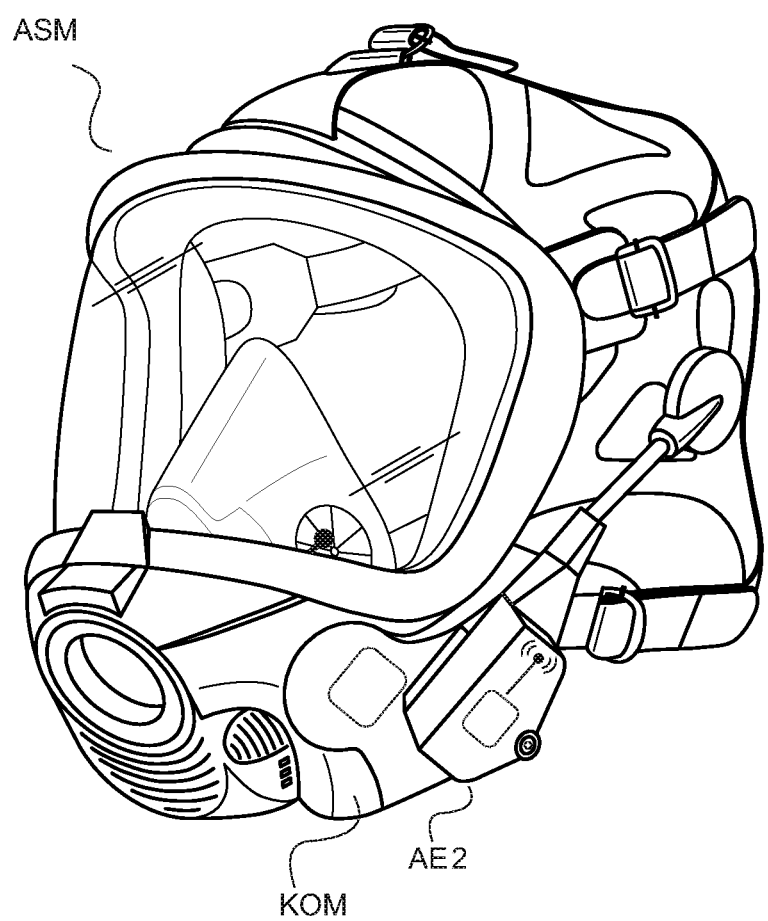
FIG. 4 is the head protection device according to the present invention in the form of a gas mask as well as a connection according to the present invention according to a second exemplary embodiment.

FIG. 4 shows the head protection device in the form of the gas mask ASM with connection unit AE2 connected to it according to a second exemplary embodiment. According to this exemplary embodiment, the connection unit AE does not have a connection cable, as described above in reference to FIGS. 1b, 8a and 8b, but rather a radio module, in order to exchange the first and the second communication signals with the radio.

To this end, FIG. 9a shows the connection unit AE2 according to the first variant of the second exemplary embodiment. In this case, the signal processor SP of the communication unit KOM is configured in the same way as described above for the first variant of the first exemplary embodiment with reference to FIG. 8a.

Instead of a connection cable, the connection unit AE2 has a radio module FM1, which, as a transponder, exchanges the communication signals with a corresponding transponder TP of the radio FG2 via a radio connection. The radio module FM1 is consequently designed such that it receives the first communication signal KOS1 as an analog electrical signal and sends the second communication signal KOS2 as an analog electrical signal. The radio module FM1 is an integral component of the connection unit AE2.

The radio transmission between the radio module FM1 and a transponder TP of the radio FG2 may take place either as an analog transmission. As an alternative, this radio transmission takes place as a digital transmission such that the radio module FM1 carries out an analog-digital or a digital-analog conversion of the analog electrical audio signals KOS1 and KOS2. In case of a digital transmission in the radio module FM1 and in the transponder TP, it is preferably digital signal transmission units according to the Bluetooth standard.

FIG. 9b shows the connection unit AE21 according to a second variant of the second exemplary embodiment. The signal processor SP1 of the communication unit KOM1 is configured here like the signal processor SP1 of the second variant of the first exemplary embodiment from FIG. 8b.

In a variation from the connection unit AE1 of the second variant of the first exemplary embodiment from FIG. 8b, according to FIG. 9b the connection unit AE2 of the second variant of the second exemplary embodiment has, instead of a cable, a radio module FM2, which receives the communication signal KOS11 as a digital electrical signal and sends the communication signal KOS21 as a digital electrical signal. For this, the radio module FM2 carries out a digital transmission to a transponder TP2 of a radio FG21. This digital transmission is preferably a digital transmission according to the Bluetooth standard.

Figure 5:
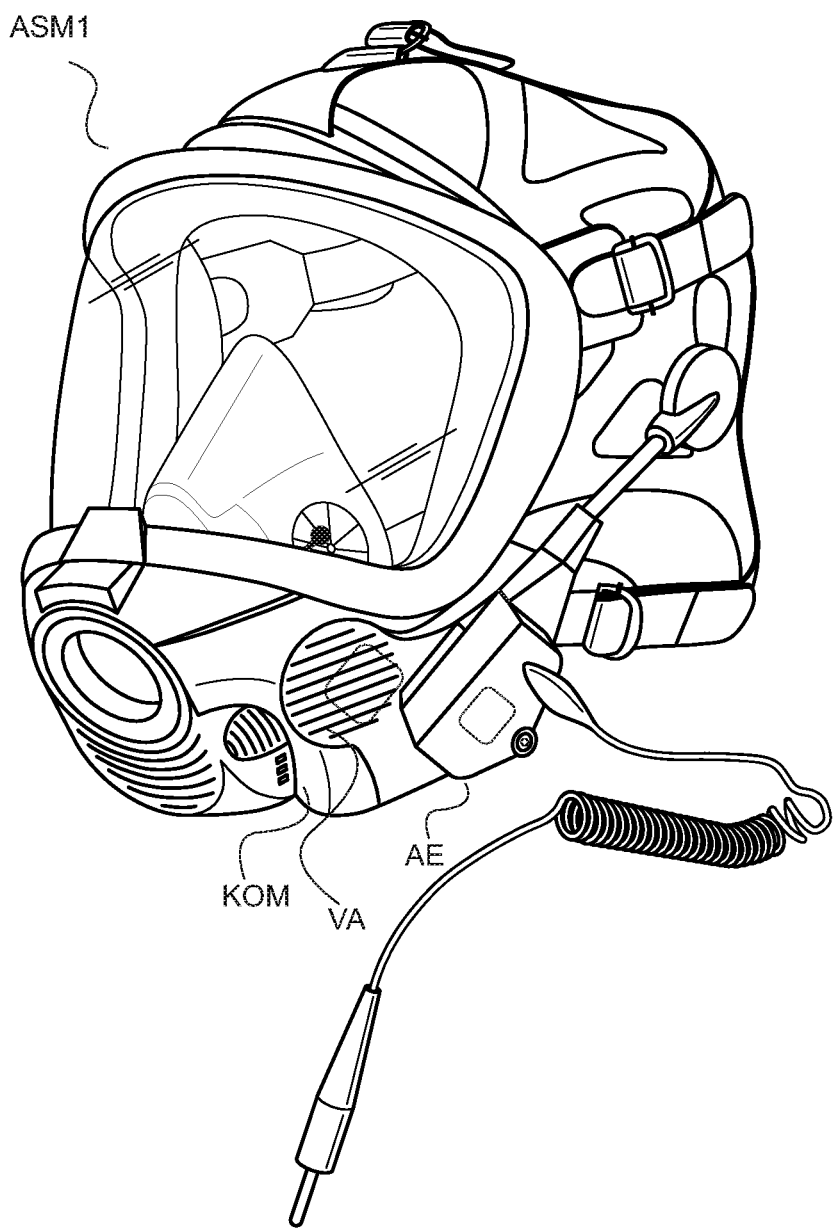
FIG. 5 is the head protection device according to the present invention in the form of a gas mask with the communication unit according to a preferred embodiment of the first exemplary embodiment.

FIG. 5 shows the head protection device according to the present invention in the form of a gas mask ASM1 with the communication unit KOM according to a preferred embodiment of the first exemplary embodiment. The gas mask ASM1 essentially corresponds with the gas mask ASM from FIG. 1a. However, the difference is that the communication unit KOM has, further, a voice speaker VA, shown by dotted speaker outputs. Such an additional speaker is also called a voice amplifier. This speaker is connected to a digital-analog interface of the signal processor and makes it possible to send the microphone signal outwards from the mask or from the communication unit KOM. This is advantageous in case the mask user would like to speak to another person in his direct surrounding area with sufficient loudness.

A connection unit AE, as described in reference to FIG. 1b, is connected to the gas mask ASM1. As an alternative to this, a connection unit AE1, as described in reference to FIG. 8b, can be connected to the gas mask ASM1, wherein the communication unit KOM can then be replaced by the communication unit KOM1 from FIG. 8b.

Figure 6:
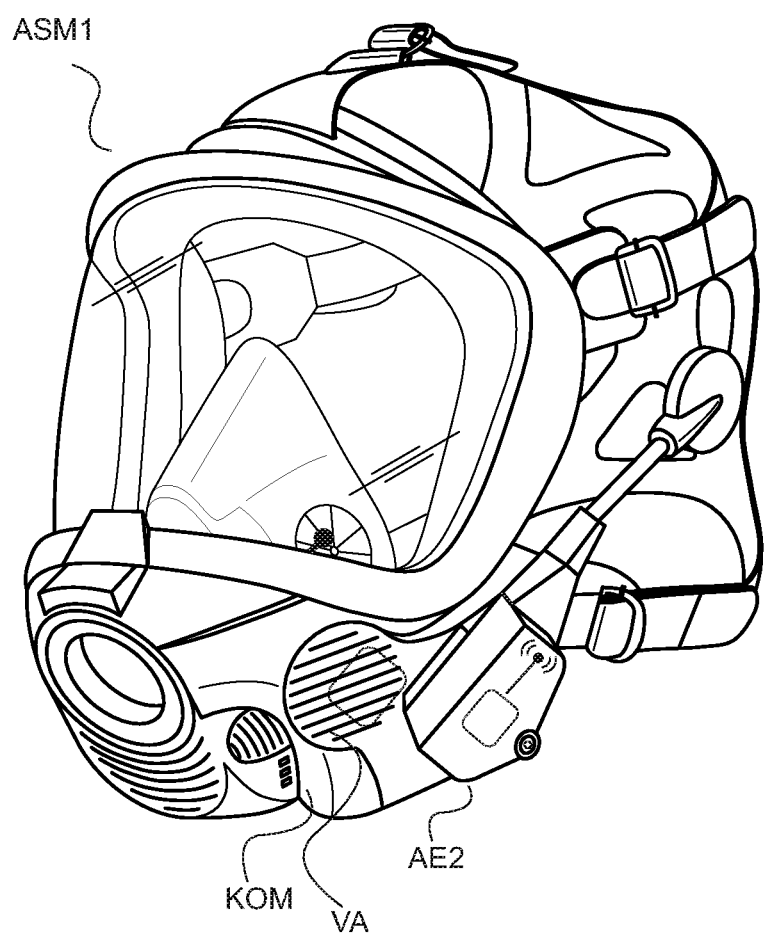
FIG. 6 is the head protection device according to the present invention in the form of a gas mask with the communication unit according to a preferred embodiment of the second exemplary embodiment.

FIG. 6 shows the head protection device according to the present invention in the form of the gas mask ASM1 with a connection unit AE2, as described in reference to FIG. 9a. As an alternative to this, a connection unit AE21, as described in reference to FIG. 9b, can be connected to the gas mask ASM1, wherein the communication unit KOM can then be replaced by the communication unit KOM1 from FIG. 9b.

Figure 7:
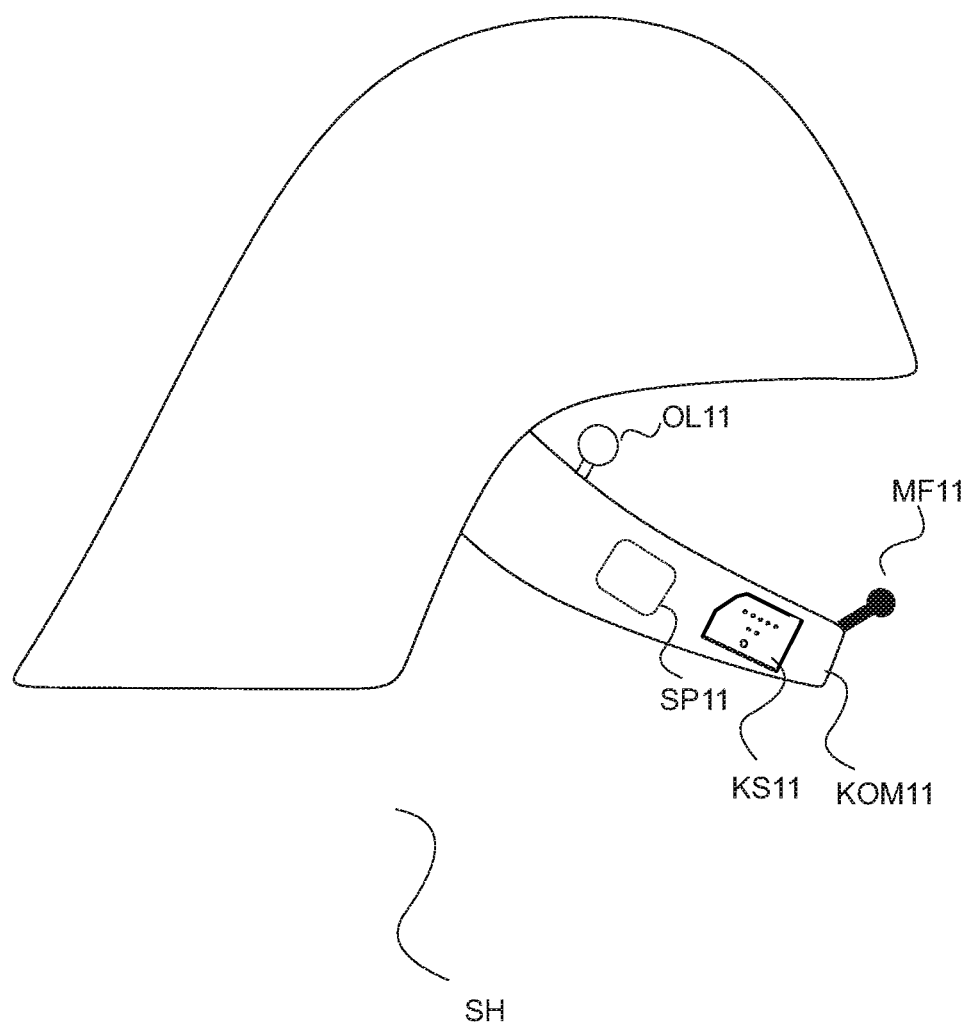
FIG. 7 is a head protection device according to the present invention in the form of a safety helmet with a communication unit, which has a communication interface and a signal processor.

FIG. 7 shows a head protection device according to the present invention in the form of a safety helmet SH with a communication unit KOM11, which has a communication interface KS11 and a signal processor SP11. FIG. 7 shows, further, a microphone MF11 and an ear speaker OL11. The communication unit KS11 is preferably not an integral component of the safety helmet SH, but rather can be brought into connection with the safety helmet via reversible mechanical connections. Both the ear speaker OL11 and/or also the microphone MF11 are preferably not integral components of the communication unit KOM11, but rather the communication unit KOM11 has at least one interface, to which the ear speaker OL11 and/or the microphone MF11 can be connected.

The communication interface KS11 is configured in the form as the communication interface KS described above in reference to FIG. 1a.

In a first alternative, the communication unit KOM11 is configured in the form as the communication unit KOM described above in reference to FIGS. 1a, 2, 8a and 9a. In this case, the signal processor SP11 is configured as the signal processor described in reference to FIGS. 1a, 8a and 9a. In this first alternative of the communication unit KOM11, a connection unit AE, as described above in reference to FIGS. 1b, 3 and 8a, or else a connection unit AE2, as described above in reference to FIGS. 4 and 9a, can be connected to this communication unit KOM11.

In a second alternative, the communication unit KOM11 is configured in the form as the communication unit KOM1 described in reference to FIGS. 8b and 9b. In this case, the signal processor SP11 is configured like the signal processor SP1 described in reference to FIGS. 8b and 9b. In this second alternative of the communication unit KOM11, a connection unit AE1, as described above in reference to FIG. 8b, or else a connection unit AE21, as described above in reference to FIG. 9b, can be connected to this communication unit KOM11.

Figure 10:
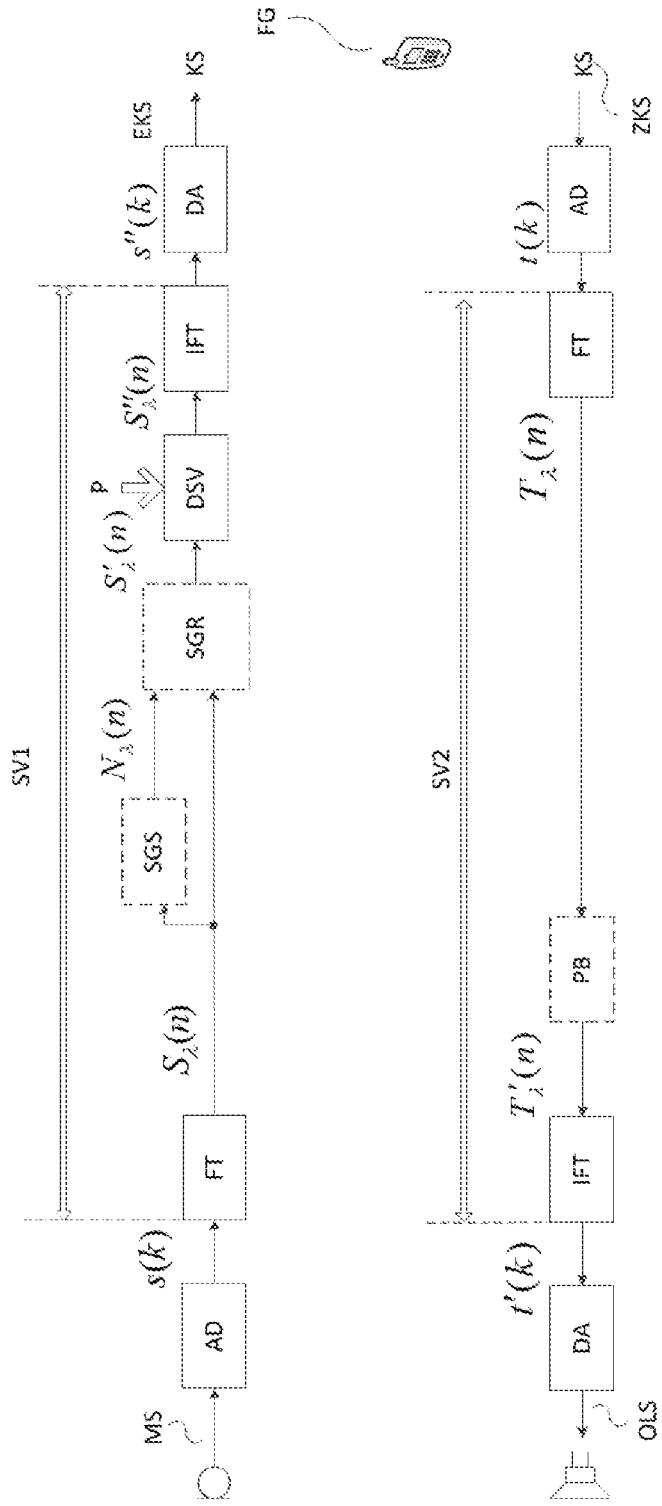
FIG. 10 is a diagram showing signal processing steps, which are carried out by the signal processor.

FIG. 10 shows digital signal processing steps SV1, SV2, which are carried out in partial steps by the signal processor SP from FIGS. 8a, 9a or by the signal processor SP1 from FIGS. 8b and 9b. Signal processing steps FT, DSV, IFT and optionally SGS, SGR, which belong to the above-mentioned digital signal processing step SV1, are contained in an upper branch. Signal processing steps FT, IFT and optionally PB, which belong to the above-mentioned signal processing step SV2, are contained in a lower branch.

The microphone signal MS is converted to a discrete-time voice signal s(k) via an analog-digital converter AD. In a step of the frequency transformation FT, which is preferably a discrete Fourier transformation or a fast Fourier transformation (FFT), discrete spectral values $S_\lambda(n)$, with spectral index n, are determined for particular voice frames, with frame index $\lambda$. The analog-digital conversion is preferably carried out at a scanning rate of 16 kHz, the frequency transformation being carried out on the basis of 128 discrete frequency support points, i.e., for example, as 128-point FFT. The processing steps SGS and SGR shown in FIG. 10 are optional signal processing steps, which are described, but which are not necessarily needed for carrying out the present invention. A disturbing signal spectrum $N_\lambda(n)$ estimated for the frame with the index $\lambda$ is preferably determined in a step of the disturbing noise estimation SGS. The spectrum $S_\lambda(n)$ is digitally filtered in a step of the disturbing noise reduction SGR, taking into account the disturbing noise spectrum $N_\lambda(n)$, which leads to the filtered signal $S_\lambda'(n)$. The estimation of the disturbing signal $N_\lambda(n)$ and the determination of the filtered signals $S_\lambda'(n)$ is preferably carried out by means of a method as described in the document "Martin, R.: 'Spectral Subtraction Based on Minimum Statistics,' EUSIPCO-94, Edinburgh, Scotland, Sep. 13-16, 1994, pp. 1182-1185."

In a signal processing step DSV, the digital signal processing of the microphone signal MS or of the first communication signal EKS to be sent is adapted as a function of the parameter data P. This leads to the adapted voice signal $S_\lambda''(n)$. In this case, an adaptation of the frequency response or of the spectral coloring of the first communication signal EKS to be generated is preferably carried out.

The resulting discrete-time electrical voice signal s"(k) to be sent is determined by means of a step of an inverse frequency transformation IFT and using an overlap-add method. This is then sent via an interface DS, preferably in the form of a digital-analog converter, as the first communication signal EKS to the communication interface KS. The sending of the first communication signal EKS to the communication interface KS thus makes possible a sending to the radio FG. This first communication signal EKS is preferably additionally sent via a separate speaker VA, as described above in reference to FIGS. 5 and 6, which is not explicitly shown in FIG. 10.

Instead of an adaptation of the frequency response as an adapted digital signal processing DSV of the microphone signal MS, the adapted digital signal processing DSV may consist of the microphone signal MS in the digital range in its signal level being limited to a maximum level value. A compression of the microphone signal preferably takes place on the basis of a compressor characteristic, which can take place in the frequency range or in the time range.

The second communication signal ZKS received via the communication interface KS is detected via an interface AD, preferably in the form of an analog-digital converter, as the discrete-time electrical signal t(k). By means of a framewise segmenting as well as a frequency transformation FT, preferably a discrete Fourier transformation or a fast Fourier transformation, the discrete signal spectrum $T_\lambda$ (k) is determined in the discrete spectral range for each frame with the index $\lambda$. In an optional step of level limitation PB, the maximum signal level of the second communication signal ZKS is preferably limited in order to avoid damage to the hearing of the mask user. This leads to the discrete spectral signal $T_\lambda'(n)$. The level limitation PB is preferably carried out as a function of the parameter data read out, which is not explicitly shown.

The second communication signal t'(k) to be sent is obtained in the discrete-time electrical signal range by means of an inverse frequency transformation IFT, preferably an inverse discrete Fourier transformation or an inverse fast Fourier transformation, as well as an overlap-add structure. This signal is then sent via a signal interface DA, preferably in the form of a digital-analog converter, to the ear speaker as an ear speaker signal OLS.

In case the signal process is configured as the signal processor SP1 from FIGS. 8b and 9b, which makes possible an exchange of digital electrical communication signals, the interface DA for sending the first communication signal EKS is not a digital-analog converter, but rather a digital signal interface DS1, as described above in reference to FIGS. 8b and 9b. Likewise then, the signal interface AD for detecting the second communication signal ZKS is not a digital-analog converter, but rather a digital signal interface DS2, as described above in reference to FIGS. 8b and 9b.

The processing step of the digital signal processing DSV is preferably carried out by a digital filter in the discrete spectral range. In this case, the parameter data P preferably preset particular amplitude values of the discrete spectral support points.

As an alternative, the signal processing DSV is not carried out by means of a filter in the discrete spectral range, but rather in the discrete time range by means of an infinite-impulse-response (IIR) filter and/or a finite-impulse-response (FIR) filter.

Figure 11:
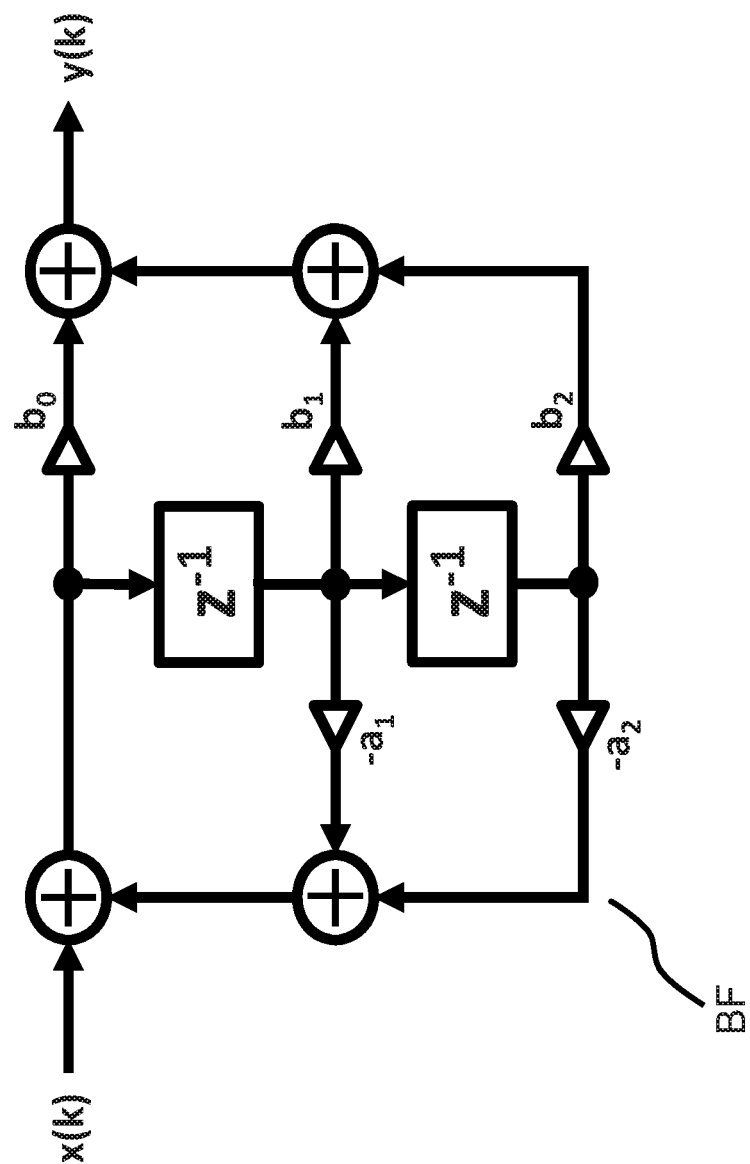
FIG. 11 is a diagram showing a preferred embodiment of a digital filter to be used.

For the purpose of spectral coloring, the discrete-time filter is preferably a so-called biquad filter BF, as shown in FIG. 11. The biquad filter BF is defined here by the filter coefficients b0, b1, b2, a1 and a2. The parameter data, which are used for determining the spectral coloring or adapting the frequency response, are thus in the case of a biquad filter the filter coefficients of the filter BF. A plurality of biquad filters are preferably connected in series, which use corresponding individual sets of parameters, so that said parameter data have all coefficients of all biquad filters to be used.

As an alternative to the biquad filter shown in FIG. 11, the digital filter to be used in the discrete time range may be a discrete-time Chebyscheff filter, which, in its impulse response, is defined by the filter coefficients, which in turn can be provided in the form of the parameter data.

The parameter data are preferably data, which indicate a type of radio. As described in the different variants of FIGS. 8a, 8b, 9a and 9b, the signal processor then derives from the parameter data P proper filter coefficients for a time range filter and/or a frequency range filter in order to adapt a signal processing of the first communication signal to the type of radio indicated. For this, the signal processor preferably has its own integrated memory unit, from which these filter coefficients are then read out as a function of the parameter data.

Figure 12:
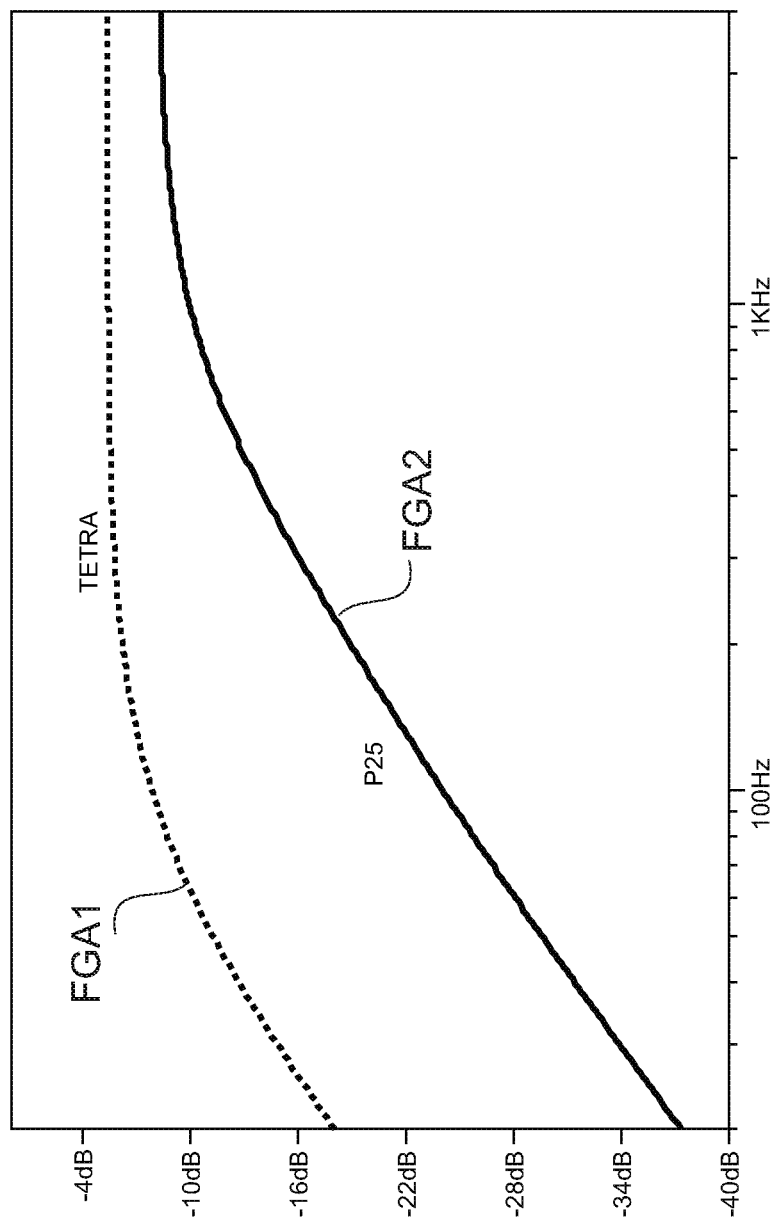
FIG. 12 is a diagram showing exemplary frequency responses for corresponding, different digital radio standards.

Finally, FIG. 12 shows two preferred frequency responses FGA1, FGA2 for particular radio standards. In case a digital radio standard is carried out according to the TETRA method, it is advantageous to employ a frequency response FGA1. A variation of this is the case when a digital transmission method according to the P25 standard is used to employ a frequency response FGA2. It is apparent that a principal formant of a voice signal, for example, at approximately 300 Hz, is markedly more greatly damped in case of the P25 standard than in case of the TETRA standard in order to be able to achieve an increased voice intelligibility.

The function of the of the various elements from FIGS. 8a, 8b, 9a as well as 9b as well as of such functional units, which are designated as "signal processor," can be provided by corresponding hardware. This is preferably hardware, which executes software in the form of program code. In this case, a processor can be implemented in the form of a single processor or in the form of a composite of a plurality of processors. In this case, the term "processor" shall not be regarded only as pure hardware for executing software, but rather can be provided as a digital signal processor (DSP), an Application Specific Integrated Circuit (ASIC), a Field Programmable Gate Array (FPGA) or as another manner of hardware implementation.

The mentioned configuration of the signal processor may be carried out by loading software onto the signal processor during the manufacture of the signal processor or else by delivering a communication unit with signal processor and enclosing a medium with a computer program product, which can then be loaded onto the signal processor.

While specific embodiments of the invention have been shown and described in detail to illustrate the application of the principles of the invention, it will be understood that the invention may be embodied otherwise without departing from such principles.

What is claimed is:

1. A head protection device comprising a communication unit, wherein the communication unit comprises:
    a communication interface configured to transmit a first communication signal and to receive a second communication signal, the communication signals being digital electrical signals; and
    a signal processor with an interface configured to send the first communication signal, an interface configured to detect a microphone signal, an interface configured to detect a second communication signal and an interface configured to send an ear speaker signal and the signal processor is configured such that the first communication signal is sent as a function of the microphone signal, and that the ear speaker signal is sent as a function of the second communication signal, wherein:
    the signal processor further comprises a data interface incorporated into the communication interface;
    the signal processor is configured to receive parameter data via the data interface;
    the signal processor is configured to adapt a digital signal processing of the microphone signal for sending the first communication signal as a function of the parameter data, the signal processor adapts the digital signal processing of the microphone signal to the sending of the first communication signal such that an adaptation of the frequency response of the first communication signal is made;

the communication interface is located in an external area of the communication unit; and the communication interface is an electrical contact unit configured to mechanically and electrically connect to a connection unit.

2. A head protection device in accordance with claim 1, wherein the communication interface has a plurality of contact elements forming an electrical contact unit.

3. A head protection device in accordance with claim 1, wherein the signal processor adapts the digital signal processing of the microphone signal to the sending of the first communication signal such that an adaptation of the signal level of the first communication signal is made.

4. A head protection device in accordance with claim 1, in combination with a connection unit for connection to the communication interface of the communication unit to form a system, the connection unit comprising:

a memory unit, which contains parameter data, wherein:

the connection unit is configured to receive a first communication signal and to transmit the first communication signal to a radio;

the connection unit is configured to receive a second communication signal from the radio and to transmit the second communication signal to the communication interface; and when the connection unit is connected to the communication interface, the memory unit can be read out via the communication interface.

5. A head protection device in accordance with claim 4, wherein the connection unit further comprises an electrical contact unit comprising a plurality of contact elements which can further be brought into connection with a corresponding contact unit of the communication interface.

6. A head protection device in accordance with claim 4, wherein the connection unit is configured to receive the first communication signal as a digital electrical signal from the communication interface and further to transmit the second communication signal as a digital electrical signal to the communication interface.

7. A head protection device in accordance with claim 4, wherein the connection unit is configured to transmit the first communication signal via a wired connection to the radio and further to receive the second communication signal via the wired connection from the radio.

8. A head protection device in accordance with claim 4, wherein the connection unit is configured to transmit the first communication signal via a wireless connection to the radio and further to receive the second communication signal via the wireless connection from the radio.

9. A communication unit for connection to a head protection device, the communication unit comprising:

a communication interface for transmitting a first communication signal and for receiving a second communication signal, the communication signals being digital electrical signals; and a signal processor with an interface configured to send the first communication signal, an interface configured to detect a microphone signal, an interface configured to detect a second communication signal and an interface configured to send an ear speaker signal and the signal processor is configured such that the first communication signal is sent as a function of the microphone signal, and that the ear speaker signal is further sent as a function of the second communication signal, wherein:

the signal processor further comprises a data interface as part of the communication interface, the data interface being separate from the first and second communication signals;

the signal processor is configured to receive parameter data via the data interface;

the signal processor is configured to adapt a digital signal processing of the microphone signal for sending the first communication signal as a function of the parameter data, the signal processor adapts the digital signal processing of the microphone signal to the sending of the first communication signal such that an adaptation of the signal level of the first communication signal is made;

the communication interface is located in an external area of the communication unit; and the communication interface is an electrical contact unit, which is configured for a selective, a mechanical and an electrical connection to one of a plurality of different types of connection units.

10. A communication unit for connection to a head protection device of a communication arrangement, the communication arrangement having a plurality of different types of connection units, the communication unit comprising:

a microphone interface for receiving a microphone signal;

a signal processor receiving the microphone signal from said microphone interface, said signal processor modifying the microphone signal as a function of parameter data to create a first communication signal, the parameter data being different for each of the plurality of different types of connection units;

a communication interface configured to selectively make a physical connection and a plurality of electrical connections to all of the different types of connection units of the communication arrangement, said communication interface receiving the first communication signal from said signal processor and providing the first communication signal at a first electrical connection of said plurality of electrical connections;

a second electrical connection of said plurality of electoral connections being configured for receiving the parameter data from a selected and connected one of the different types of connection units;

said signal processor receiving the parameter data from said communication interface, and using the parameter data to modify the microphone signal to create the first communication signal.

11. A communication unit in accordance with claim 10, wherein:

each of the different types of connection units have a different communication protocol for transmitting the first communication signal away from the communication unit;

the parameter data of each of the different types of connection units have values for modifying the microphone signal according to a respective communication protocol of a respective one of the different types of connection units.

12. A communication unit in accordance with claim 10, wherein:

said communication interface has a third electrical connection of said plurality of electrical connections for receiving a second communication signal;

said signal processor modifies the second communication signal to create an ear speaker signal;

a speaker interface receives the ear speaker signal and is configured to provide the ear speaker signal to a speaker.

* * * * *